US012726920B2

(12) United States Patent
Panzner et al.

(10) Patent No.: US 12,726,920 B2
(45) Date of Patent: Sep. 1, 2026

(54) METHOD AND APPARATUS FOR SIDELINK SYNCHRONIZATION

(71) Applicant: Nokia Technologies Oy, Espoo (FI)

(72) Inventors: Berthold Panzner, Munich (DE); Jakob Lindbjerg Buthler, Aalborg (DK); Torsten Wildschek, Gloucester (GB); Jari Olavi Lindholm, Espoo (FI)

(73) Assignee: Nokia Technologies Oy, Espoo (FI)

( * ) Notice: Subject to any disclaimer, the term of this patent is extended or adjusted under 35 U.S.C. 154(b) by 316 days.

(21) Appl. No.: 18/561,501

(22) PCT Filed: Apr. 11, 2022

(86) PCT No.: PCT/EP2022/059619

§ 371 (c)(1),
(2) Date: Nov. 16, 2023

(87) PCT Pub. No.: WO2022/242962

PCT Pub. Date: Nov. 24, 2022

(65) Prior Publication Data

US 2024/0259964 A1 Aug. 1, 2024

Related U.S. Application Data

(60) Provisional application No. 63/189,847, filed on May 18, 2021.

(51) Int. Cl.
*H04W 56/00* (2009.01)
*H04W 92/18* (2009.01)

(52) U.S. Cl.
CPC ............ *H04W 56/00* (2013.01); *H04W 92/18* (2013.01)

(58) Field of Classification Search
None
See application file for complete search history.

(56) References Cited

U.S. PATENT DOCUMENTS 12,177,801 B2 * 12/2024 Lindholm ......... H04W 56/0015
2017/0289940 A1 10/2017 Yang et al.
2018/0213498 A1 * 7/2018 Khoryaev ............ H04B 7/2684
2019/0357166 A1 * 11/2019 Blasco Serrano ........................... H04W 56/0015
2020/0053683 A1 * 2/2020 Gulati ............... H04W 56/0045
2021/0037493 A1 * 2/2021 Gulati .................. H04B 17/318
2021/0051617 A1 * 2/2021 Gulati ............... H04W 56/0005

(Continued)

FOREIGN PATENT DOCUMENTS

WO 2018126633 A1 7/2018
WO 2021239251 A1 12/2021

OTHER PUBLICATIONS

"3rd Generation Partnership Project; Technical Specification Group Radio Access Network; Overall description of Radio Access Network (RAN) aspects for Vehicle-to-everything (V2X) based on LTE and NR (Release 16)", 3GPP TR 37.985 V16.0.0, Jun. 2020, pp. 1-35.

(Continued)

*Primary Examiner* — Lonnie V Sweet
(74) *Attorney, Agent, or Firm* — Lippes Mathias LLP

(57) ABSTRACT

There is provided a method comprising transmitting from a user equipment information about sidelink synchronization of the user equipment; and transmitting from the user equipment information about reduced reception of sidelink synchronization signals at the user equipment.

18 Claims, 6 Drawing Sheets

(56) References Cited

U.S. PATENT DOCUMENTS

| | | | | |
|---|---|---|---|---|
| 2021/0321348 | A1* | 10/2021 | Ohara | H04L 5/0048 |
| 2022/0183091 | A1* | 6/2022 | Vos | H04W 56/001 |
| 2023/0014303 | A1* | 1/2023 | Di Girolamo | H04W 72/20 |
| 2023/0066448 | A1* | 3/2023 | Tseng | H04W 72/20 |
| 2023/0156854 | A1* | 5/2023 | Cheng | H04W 76/28 370/329 |
| 2023/0164873 | A1* | 5/2023 | Hahn | H04W 52/0216 370/328 |

OTHER PUBLICATIONS

"Reply LS on sidelink synchronization under multiple synchronization sources with different timing", 3GPP TSG RAN WG2#108, R2-1916465, RAN2, Nov. 18-22, 2019, 5 pages.

"Reply LS on sidelink synchronization under multiple synchronization sources with different timing", 3GPP TSG-RAN WG1 Meeting #99, R1-1913696, RAN1, Nov. 18-22, 2019, 1 page.

"Summary of [704]", 3GPP TSG-RAN WG2 #113bis-e, R2-2104469, OPPO, Agenda Item: 6.2.2, Apr. 2019, 11 pages.

"3rd Generation Partnership Project; Technical Specification Group Radio Access Network; NR; Requirements for support of radio resource management (Release 17)", 3GPP TS 38.133, V17.1.0, Mar. 2021, 2172 pages.

"3rd Generation Partnership Project; Technical Specification Group Radio Access Network; NR; Radio Resource Control (RRC) protocol specification (Release 15)", 3GPP TS 38.331 V15.13.0, Mar. 2021, pp. 1-540.

"3rd Generation Partnership Project; Technical Specification Group Radio Access Network; NR; Medium Access Control (MAC) protocol specification (Release 16)", 3GPP TS 38.321 V16.4.0, Mar. 2021, pp. 1-157.

"SL DRX for SL groupcast", 3GPP TSG-RAN WG2 Meeting #115 Electronic, R2-2108471, Nokia, Agenda Item: 8.15.2, Aug. 16-27, 2021, 3 pages.

"Further issues on SL DRX", 3GPP TSG-RAN WG2 Meeting #116 Electronic, R2-2109812, Nokia, Agenda Item: 8.15.2, Nov. 1-12, 2021, 3 pages.

International Search Report and Written Opinion received for corresponding Patent Cooperation Treaty Application No. PCT/EP2022/059619, dated Aug. 5, 2022, 11 pages.

"Left issue on synchronization of PSSCH vs. PSFCH", 3GPP TSG-RAN WG2 #113bis-e, R2-2102881, Agenda Item: 6.2.2, OPPO, Apr. 2021, pp. 1-3.

"NR Sidelink Synchronization Reference Search Optimization at UE for Power Saving", 3GPP TSG-RAN WG2 Meeting #116 Electronic, R2-2200786, Agenda item: 8.15.2., Nokia, Jan. 17-25, 2022, 3 pages.

Office action received for corresponding European Patent Application No. 22721404.6, dated Apr. 17, 2024, 4 pages.

Notice of Allowance received for corresponding European Patent Application No. 22721404.6, dated Mar. 7, 2025, 7 pages.

* cited by examiner

```
-- ASN1START
-- TAG-MASTERINFORMATIONBLOCKSIDELINK-START
MasterInformationBlockSidelink ::=   SEQUENCE {
      sl-TDD-Config-r16               BIT STRING (SIZE (12)),
      inCoverage-r16                  BOOLEAN,
      directFrameNumber-r16           BIT STRING (SIZE (10)),
      slotIndex-r16                   BIT STRING (SIZE (7)),
      sl-DRX-SyncIndication-r16        BIT STRING (SIZE(2))
}
-- TAG-MASTERINFORMATIONBLOCKSIDELINK-STOP
-- ASN1STOP
```

METHOD AND APPARATUS FOR SIDELINK SYNCHRONIZATION

RELATED APPLICATION

This application was originally filed as PCT Application No. PCT/EP2022/059619, filed on Apr. 11, 2022, which claims priority from U.S. Provisional Application No. 63/189,847, filed on May 18, 2021, each of which is incorporated herein by reference in its entirety.

TECHNICAL FIELD

The present disclosure relates to apparatus, a method, and a computer program, and in particular but not exclusively to apparatus, methods and computer programs for sidelink synchronization.

BACKGROUND

Some communication systems may involve a user equipment sending data directly to another user equipment, other than via network infrastructure such as base stations. The direct interface between two user equipments may be referred to as a sidelink, and the direct sending of data may be supported by the transmission of sidelink synchronization signals by user equipments.

SUMMARY

A method comprising: transmitting from a user equipment information about sidelink synchronization of the user equipment; and transmitting from the user equipment information about reduced reception of sidelink synchronization signals at the user equipment.

The information about sidelink synchronization of the user equipment may indicate that the user equipment is not synchronized to a base station, or a satellite system or another user equipment.

Transmitting the information about reduced reception of sidelink synchronization signals at the user equipment may be at least partly based on a determination at the user equipment that the user equipment is not synchronized to a base station, or a satellite system or another user equipment.

The method may comprise including the information about sidelink synchronization of the user equipment and the information about reduced reception of sidelink synchronization signals at the user equipment in a sidelink synchronization signal block.

The method may comprise including the information about reduced reception of sidelink synchronization signals at the user equipment in a master information block of the sidelink synchronization signal block.

The information about reduced reception of sidelink synchronization signals at the user equipment may comprise information about timing of one or more active phases of a sidelink discontinuous reception mode of operation at the user equipment.

The method may comprise: detecting, at the user equipment, transmission of information about one or more sidelink synchronization signals by another user equipment; and adjusting one or more parameters of the sidelink discontinuous reception mode of operation based on the information about one or more sidelink synchronization signals by another user equipment.

The information about one or more sidelink synchronization signals by another user equipment may comprise information about timing of one or more sidelink synchronization signals by another user equipment.

The method may comprise: after adjusting the one or more parameters of the sidelink discontinuous reception of operation, detecting, at the user equipment, transmission of one or more sidelink synchronization signals by the another user equipment; and updating synchronization of the user equipment based on the one or more sidelink synchronization signals.

Adjusting one or more parameters of the sidelink discontinuous reception mode of operation may comprise extending an active phase of the sidelink discontinuous reception mode of operation.

The method may comprise detecting the transmission of information about one or more sidelink synchronization signals by another user equipment during a first active phase of the sidelink discontinuous reception mode of operation; and adjusting one or more parameters of the sidelink discontinuous reception mode of operation may comprise extending the first active phase of the sidelink discontinuous reception mode of operation.

A method comprising: detecting, at a first user equipment, transmission of information about reduced reception of sidelink synchronization signals at a second user equipment; and transmitting, from the first user equipment at a transmission time based on the information about reduced reception of sidelink synchronization signals at the second user equipment, information about timing of one or more sidelink synchronization signals by the first user equipment: or adjusting a timing of transmission of one or more synchronization signals by the first user equipment, based on the information about reduced reception of sidelink synchronization signals at the second user equipment.

The information about reduced reception of sidelink synchronization signals at the second user equipment may comprise information about timing of one or more active phases of a sidelink discontinuous reception mode of operation at the second user equipment.

The method may comprise deriving the information about reduced reception of sidelink synchronization signals at the second user equipment from a sidelink synchronization signal block transmission of the second user equipment.

The method may comprise deriving the information about reduced reception of sidelink synchronization signals at the second user equipment from a master information block of the sidelink synchronization signal block transmission of the second user equipment.

The method may comprise transmitting, at the first user equipment, the one or more synchronization signals.

An apparatus comprising: at least one processor; and at least one memory including computer program code, the at least one memory and computer program code configured to, with the at least one processor, cause the apparatus to perform: transmitting from the apparatus information about sidelink synchronization of the apparatus; and transmitting from the apparatus information about reduced reception of sidelink synchronization signals at the apparatus.

In an embodiment, said apparatus is a user equipment.

The information about sidelink synchronization of the user equipment may indicate that the user equipment is not synchronized to a base station, or a satellite system or another user equipment.

The at least one memory and computer program code may be configured to, with the at least one processor, cause the apparatus to transmit the information about reduced reception of sidelink synchronization signals at the user equipment at least partly based on a determination at the user equipment that the user equipment is not synchronized to a base station, or a satellite system or another user equipment.

The at least one memory and computer program code may be configured to, with the at least one processor, cause the apparatus to include the information about sidelink synchronization of the user equipment and the information about reduced reception of sidelink synchronization signals at the user equipment in a sidelink synchronization signal block.

The at least one memory and computer program code may be configured to, with the at least one processor, cause the apparatus to include the information about reduced reception of sidelink synchronization signals at the user equipment in a master information block of the sidelink synchronization signal block.

The information about reduced reception of sidelink synchronization signals at the user equipment may comprise information about timing of one or more active phases of a sidelink discontinuous reception mode of operation at the user equipment.

The at least one memory and computer program code may be configured to, with the at least one processor, cause the apparatus to: detect, at the user equipment, transmission of information about one or more sidelink synchronization signals by another user equipment; and adjust one or more parameters of the sidelink discontinuous reception mode of operation based on the information about one or more sidelink synchronization signals by another user equipment.

The information about one or more sidelink synchronization signals by another user equipment may comprise information about timing of one or more sidelink synchronization signals by another user equipment.

The at least one memory and computer program code may be configured to, with the at least one processor, cause the apparatus to: after adjusting the one or more parameters of the sidelink discontinuous reception of operation, detect, at the user equipment, transmission of one or more sidelink synchronization signals by the another user equipment; and update synchronization of the user equipment based on the one or more sidelink synchronization signals.

Adjusting one or more parameters of the sidelink discontinuous reception mode of operation may comprise extending an active phase of the sidelink discontinuous reception mode of operation.

The at least one memory and computer program code may be configured to, with the at least one processor, cause the apparatus to: detect the transmission of information about one or more sidelink synchronization signals by another user equipment during a first active phase of the sidelink discontinuous reception mode of operation; and adjusting one or more parameters of the sidelink discontinuous reception mode of operation may comprise extending the first active phase of the sidelink discontinuous reception mode of operation.

An apparatus comprising: at least one processor; and at least one memory including computer program code, the at least one memory and computer program code configured to, with the at least one processor, cause the apparatus to perform: detecting, at the apparatus, transmission of information about reduced reception of sidelink synchronization signals at a second user equipment; and transmitting, from the apparatus at a transmission time based on the information about reduced reception of sidelink synchronization signals at the second user equipment, information about timing of one or more sidelink synchronization signals by the apparatus: or adjusting a timing of transmission of one or more synchronization signals by the apparatus, based on the information about reduced reception of sidelink synchronization signals at the second user equipment.

In an embodiment, the apparatus is a first user equipment.

The information about reduced reception of sidelink synchronization signals at the second user equipment may comprise information about timing of one or more active phases of a sidelink discontinuous reception mode of operation at the second user equipment.

The at least one memory and computer program code may be configured to, with the at least one processor, cause the apparatus to: derive the information about reduced reception of sidelink synchronization signals at the second user equipment from a sidelink synchronization signal block transmission of the second user equipment.

The at least one memory and computer program code may be configured to, with the at least one processor, cause the apparatus to: derive the information about reduced reception of sidelink synchronization signals at the second user equipment from a master information block of the sidelink synchronization signal block transmission of the second user equipment.

The at least one memory and computer program code may be configured to, with the at least one processor, cause the apparatus to: transmit, at the first user equipment, the one or more synchronization signals.

Apparatus comprising means for transmitting from the apparatus information about sidelink synchronization of the apparatus; and means for transmitting from the apparatus information about reduced reception of sidelink synchronization signals at the apparatus.

In an embodiment, the apparatus is a user equipment.

The information about sidelink synchronization of the user equipment may indicate that the user equipment is not synchronized to a base station, or a satellite system or another user equipment.

The apparatus may comprise means for transmitting the information about reduced reception of sidelink synchronization signals at the user equipment at least partly based on a determination at the user equipment that the user equipment is not synchronized to a base station, or a satellite system or another user equipment.

The apparatus may comprise means for including the information about sidelink synchronization of the user equipment and the information about reduced reception of sidelink synchronization signals at the user equipment in a sidelink synchronization signal block.

The apparatus may comprise means for including the information about reduced reception of sidelink synchronization signals at the user equipment in a master information block of the sidelink synchronization signal block.

The information about reduced reception of sidelink synchronization signals at the user equipment may comprise information about timing of one or more active phases of a sidelink discontinuous reception mode of operation at the user equipment.

The apparatus may comprise: means for detecting, at the user equipment, transmission of information about one or more sidelink synchronization signals by another user equipment; and means for adjusting one or more parameters of the sidelink discontinuous reception mode of operation based on the information about one or more sidelink synchronization signals by another user equipment.

The information about one or more sidelink synchronization signals by another user equipment may comprise information about timing of one or more sidelink synchronization signals by another user equipment.

The apparatus may comprise: means for, after adjusting the one or more parameters of the sidelink discontinuous reception of operation, detecting, at the user equipment, transmission of one or more sidelink synchronization signals by the another user equipment; and means for updating synchronization of the user equipment based on the one or more sidelink synchronization signals.

Adjusting one or more parameters of the sidelink discontinuous reception mode of operation may comprise extending an active phase of the sidelink discontinuous reception mode of operation.

The apparatus may comprise means for detecting the transmission of information about one or more sidelink synchronization signals by another user equipment during a first active phase of the sidelink discontinuous reception mode of operation; and adjusting one or more parameters of the sidelink discontinuous reception mode of operation may comprise extending the first active phase of the sidelink discontinuous reception mode of operation.

Apparatus comprising: means for detecting, at the apparatus, transmission of information about reduced reception of sidelink synchronization signals at a second user equipment; and means for transmitting, from the apparatus at a transmission time based on the information about reduced reception of sidelink synchronization signals at the second user equipment, information about timing of one or more sidelink synchronization signals by the apparatus: or means for adjusting a timing of transmission of one or more synchronization signals by the apparatus, based on the information about reduced reception of sidelink synchronization signals at the second user equipment.

In an embodiment, the apparatus is a first user equipment.

The information about reduced reception of sidelink synchronization signals at the second user equipment may comprise information about timing of one or more active phases of a sidelink discontinuous reception mode of operation at the second user equipment.

The apparatus may comprise means for deriving the information about reduced reception of sidelink synchronization signals at the second user equipment from a sidelink synchronization signal block transmission of the second user equipment.

The apparatus may comprise means for deriving the information about reduced reception of sidelink synchronization signals at the second user equipment from a master information block of the sidelink synchronization signal block transmission of the second user equipment.

The apparatus may comprise means for transmitting, at the first user equipment, the one or more synchronization signals.

Apparatus comprising transmitting circuitry for transmitting from a user equipment information about sidelink synchronization of the user equipment, and transmitting from the user equipment information about reduced reception of sidelink synchronization signals at the user equipment.

Apparatus comprising: detecting circuitry for detecting, at a first user equipment, transmission of information about reduced reception of sidelink synchronization signals at a second user equipment; and transmitting circuitry for transmitting, from the first user equipment at a transmission time based on the information about reduced reception of sidelink synchronization signals at the second user equipment, information about timing of one or more sidelink synchronization signals by the first user equipment: or adjusting circuitry for adjusting a timing of transmission of one or more synchronization signals by the first user equipment, based on the information about reduced reception of sidelink synchronization signals at the second user equipment.

A computer readable medium comprising program instructions stored thereon for performing transmitting from a user equipment information about sidelink synchronization of the user equipment, and transmitting from the user equipment information about reduced reception of sidelink synchronization signals at the user equipment.

A computer readable medium comprising program instructions stored thereon for performing: detecting, at a first user equipment, transmission of information about reduced reception of sidelink synchronization signals at a second user equipment; and transmitting, from the first user equipment at a transmission time based on the information about reduced reception of sidelink synchronization signals at the second user equipment, information about timing of one or more sidelink synchronization signals by the first user equipment: or adjusting a timing of transmission of one or more synchronization signals by the first user equipment, based on the information about reduced reception of sidelink synchronization signals at the second user equipment.

A computer program comprising computer executable code which when run on at least one processor is configured to cause an apparatus at least to: transmit from a user equipment information about sidelink synchronization of the user equipment, and transmit from the user equipment information about reduced reception of sidelink synchronization signals at the user equipment.

A computer program comprising computer executable code which when run on at least one processor is configured to cause an apparatus at least to: detect, at a first user equipment, transmission of information about reduced reception of sidelink synchronization signals at a second user equipment; and transmit, from the first user equipment at a transmission time based on the information about reduced reception of sidelink synchronization signals at the second user equipment, information about timing of one or more sidelink synchronization signals by the first user equipment: or adjust a timing of transmission of one or more synchronization signals by the first user equipment, based on the information about reduced reception of sidelink synchronization signals at the second user equipment.

A non-transitory computer readable medium comprising program instructions stored thereon for performing transmitting from a user equipment information about sidelink synchronization of the user equipment, and transmitting from the user equipment information about reduced reception of sidelink synchronization signals at the user equipment.

A non-transitory computer readable medium comprising program instructions stored thereon for performing: detecting, at a first user equipment, transmission of information about reduced reception of sidelink synchronization signals at a second user equipment; and transmitting, from the first user equipment at a transmission time based on the information about reduced reception of sidelink synchronization signals at the second user equipment, information about timing of one or more sidelink synchronization signals by the first user equipment: or adjusting a timing of transmission of one or more synchronization signals by the first user equipment, based on the information about reduced reception of sidelink synchronization signals at the second user equipment.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Some example embodiments will now be described in further detail, by way of example only, with reference to the following examples and accompanying drawings, in which.

DETAILED DESCRIPTION

The following description makes mention of user equipments (UEs) operating according to 3GPP Releases 16 and 17, but the underlying technique is also applicable to other user equipments, such as e.g. user equipments operating according to later 3GPP releases.

The term "user equipment" here refers to any device, apparatus or component implementing user equipment functionality; and may include, for example, vehicles or other machinery implementing UE functionality.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee R, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 11:
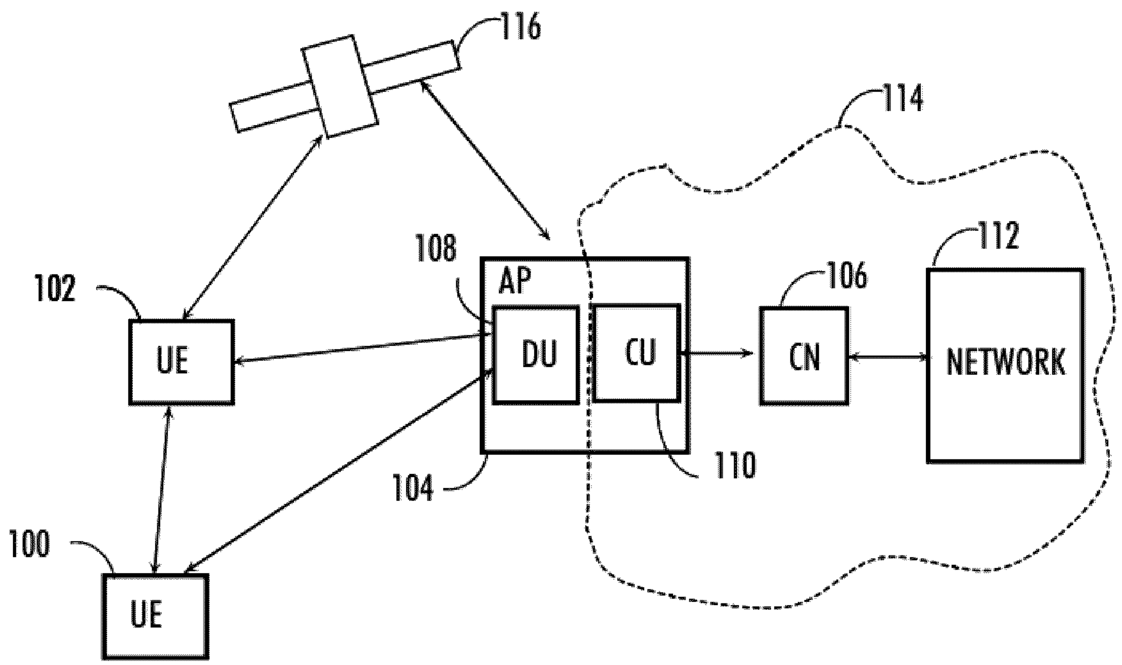
FIG. 11 illustrates an example system to which embodiments may be applied.

FIG. 11 depicts examples of simplified system architectures only showing some elements and functional entities, all being logical units, whose implementation may differ from what is shown. The connections shown in FIG. 11 are logical connections: the actual physical connections may be different. It is apparent to a person skilled in the art that the system typically comprises also other functions and structures than those shown in FIG. 11.

The embodiments are not, however, restricted to the system given as an example but a person skilled in the art may apply the solution to other communication systems provided with necessary properties.

The example of FIG. 11 shows a part of an exemplifying radio access network. For example, the radio access network may support sidelink communications described below in more detail.

FIG. 11 shows devices 100 and 102. The devices 100 and 102 are configured to be in a wireless connection on one or more communication channels with a node 104. The node 104 is further connected to a core network 106. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc.

The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 11) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cm Wave, 6 or above 24 GHz—cm Wave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 11 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g) NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 11 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 11). A HNB Gateway (HNB-GW), which is typically installed within an operator's network may aggregate traffic from a large number of HNBs back to a core network.

Figure 1:
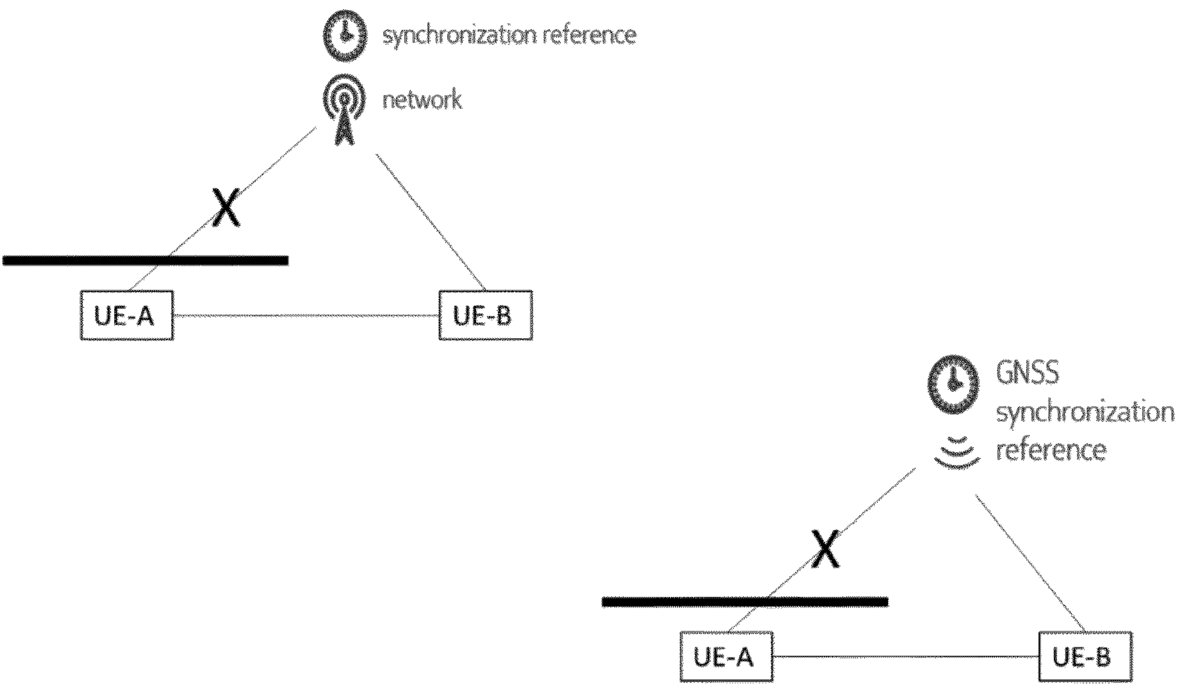
FIG. 1 shows a representation of sidelink synchronization between user equipments according to some example embodiments.

FIG. 1 shows an example of two UEs, such as the devices 100 and 102 of FIG. 11 or similar devices, in different situations regarding reception of transmissions by a primary synchronization reference such as transmissions by a network base station (e.g. 5G NR gNB) or satellite transmissions of a global navigation satellite system (GNSS). A first UE (UE-B) is in a location where it can detect transmission of the primary synchronization reference with sufficient quality. In contrast, the second UE (UE-A) is in a location where it cannot detect transmissions of the primary synchronization reference with sufficient quality, because e.g. of some structure preventing transmissions of the primary synchronization reference reaching the UE-A with sufficient quality. For example, UE-A may have entered a road tunnel, an underground car park, or an underground cellar out of range of any base station or GNSS. Unless UE-A can detect synchronization signals transmitted by one or more peer UEs with direct or indirect synchronization to a base station or GNSS, UE-A may rely on its own internal clock (lowest synchronization priority level 8). In FIG. 1, although UE-A is in a location where it is within range of transmissions broadcast by UE-B, a (preconfigured) sidelink discontinuous reception (sl-drx) configuration of UE-A may prevent UE-A from following the sidelink synchronization provided indirectly by the primary synchronization reference via UE-B.

The regular operation of UE-B may involve UE-B periodically broadcasting a sidelink synchronization signal block (S-SSB). An example of a S-SSB is described in detail further below, but the S-SSB may, for example, occupy 1-slot in the time domain, and UE-B may, for example, transmit the S-SSB with a periodicity of 16 frames (160 ms).

Reducing battery power consumption may be a significant feature for some UEs; and in this example. UE-A may be operating in a power-saving mode (sidelink discontinuous reception (sl-DRX) mode) according to which the UE reduces reception of transmissions on radio resources allocated to sidelink transmissions, including transmissions of S-SSB by other UEs such as UE-B. Sidelink DRX mode operation involves active phases in which the UE uses power to detect transmissions on radio resources allocated to sidelink transmissions, and inactive phases in which the UE powers down its circuitry for detecting sidelink transmissions. The periodicity, timing and duration of the active phases may be defined by sl-DRX-parameters referred to as sl-drx-Cycle, sl-DRX-StartOffset, sl-drx-SlotOffset and sl-drx-on Duration Timer.

The sl-DRX pattern of active and inactive phases is based on the internal clock of UE-A, and it may happen that the active phases never coincide with S-SSB transmissions made by UE-B, or only very rarely coincide with S-SSB transmissions made by UE-B.

Figure 2:
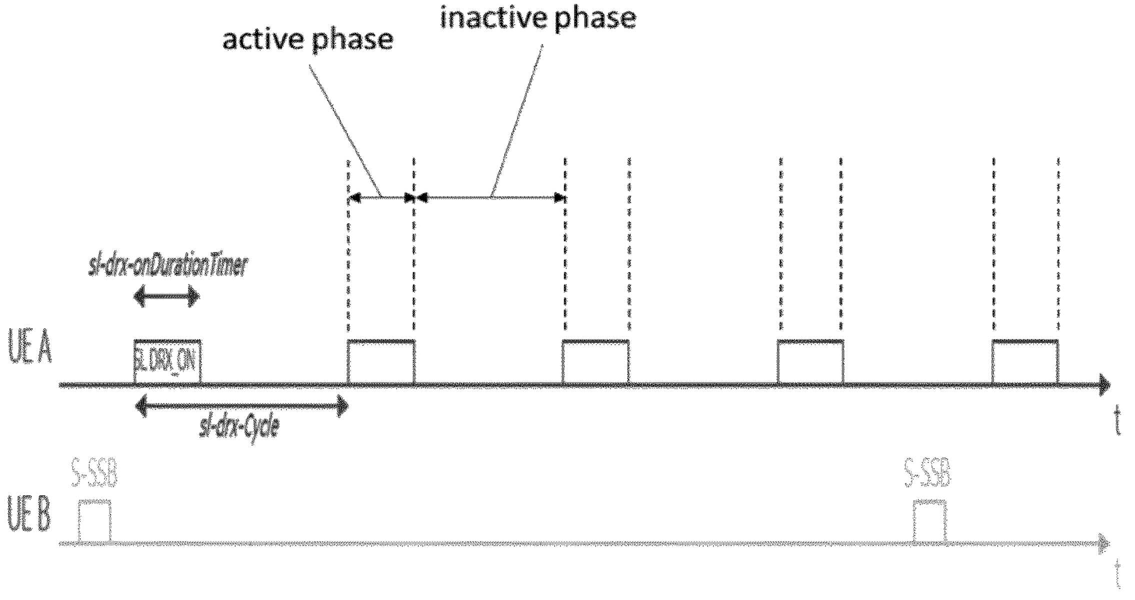
FIG. 2 shows a representation of an example of a power-saving mode of sidelink operation at a user equipment according to example embodiments.

FIG. 2 shows one example of a sl-DRX operating mode for UE-A. The periodicity of the active phases of UE-A is high relative to the periodicity of S-SSB transmissions by UE-B. The active phases may never coincide with S-SSB transmissions made by UE-B, or may only very rarely coincide with S-SSB transmissions made by UE-B.

Figure 3:
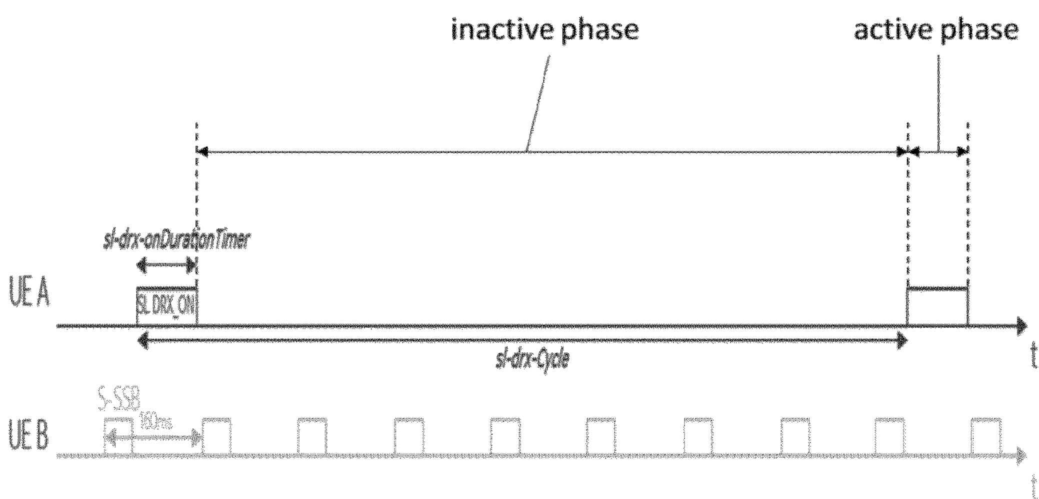
FIG. 3 shows a representation of another example of a power-saving mode of sidelink operation at a user equipment according to example embodiments.

FIG. 3 shows another example of a sl-DRX operating mode for UE-A. The periodicity of the active phases of UE-A is low relative to the periodicity of S-SSB transmissions by UE-B. Again, the active phases of UE-A may never coincide with S-SSB transmissions made by UE-B, or may only very rarely coincide with S-SSB transmissions made by UE-B.

For example, when the S-SSB duration and S-SSB periodicity for UE-B are 1 ms (1-slot) and 160 ms (160 frames), and the sl-DRX-onDurationTimer and sl-drx-Cycle for UE-A are 10 ms and 1000 ms, respectively: there may be a delay of up to 80160 ms before an SL-DRX-On period at UE-A coincides with a S-SSB broadcast by UE-B.

Figure 4:
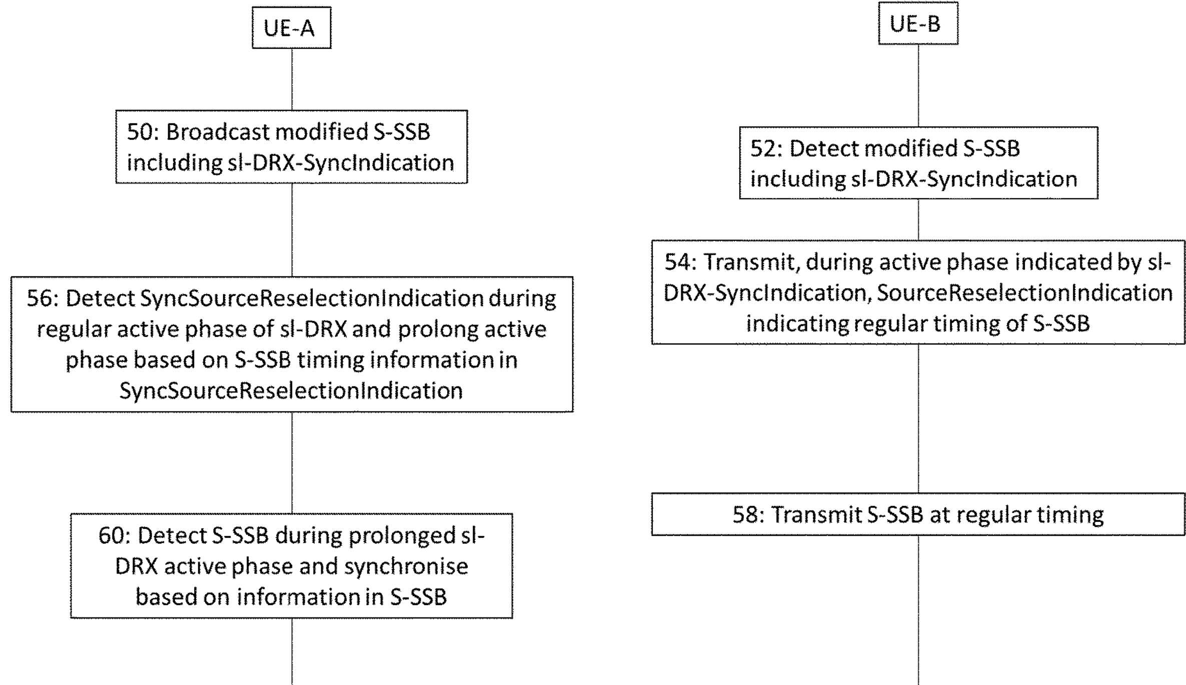
FIG. 4 shows a representation of an example of operations at two user equipments according to an example embodiment.

FIG. 4 shows one example of operations at UE-A and UE-B according to one example embodiment.

During an active phase of sl-DRX operation at UE-A, UE-A makes a broadcast transmission (OPERATION 50) indicating that it is seeking a sidelink synchronization reference while operating in sl-DRX mode. This first indication may be referred to as sl-DRX-SyncIndication.

UE-B detects (OPERATION 52) the sl-DRX-SyncIndication transmitted by UE-A, and derives information from the sl-DRX-SyncIndication about the sl-DRX configuration of UE-A. In particular, UE-B derives information about the regular timing of the sl-DRX active phases of UE-A.

UE-B transmits (OPERATION 54) via sidelink resources, at one or more times when UE-A is actively detecting transmissions on sidelink resources (i.e. during a sl-DRX active phase of UE-A), a dedicated message comprising a second indication of one or more UE-A times at which UE-B makes one or more S-SSB transmissions. This second indication may be referred to as a SyncSourceReselectionIndication. For example, UE-B may have multiple RF frontends, and maintain multiple clocks; and UE-B may temporarily adapt one of its clocks to UE-A's clock (as indicated by the S-SSB transmission of UE-A) for transmitting the SyncSourceReselectionIndication to UE-A. The SyncSourceReselectionIndication indicates to UE-A that a higher priority synchronization source is available, and indicates the timing (based on UE-A's DFN) of future S-SSB transmissions by UE-B.

The timing of transmission of the SyncSourceReselectionIndication was selected by UE-B to coincide with an sl-DRX active phase of UE-A; and UE-A therefore detects (OPERATION 56) the SyncSourceReselectionIndication. Based on the S-SSB timing information provided by the SyncSourceReselectionIndication, UE-A extends the duration of its current sl-DRX active phase (the active phase during which it detected the SyncSourceReselectionIndication) such that UE-A can detect one or more S-SSB transmissions by UE.

UE-B continues to make S-SSB transmissions (OPERATION 58) without any adjustment to the sl-DRX operation of UE-A.

UE-A detects (OPERATION 60) the S-SSB transmission made by UE-B, and adjusts its clock based on the information provided by the S-SSB. UE-A and UE-B are now synchronized.

Figure 5:
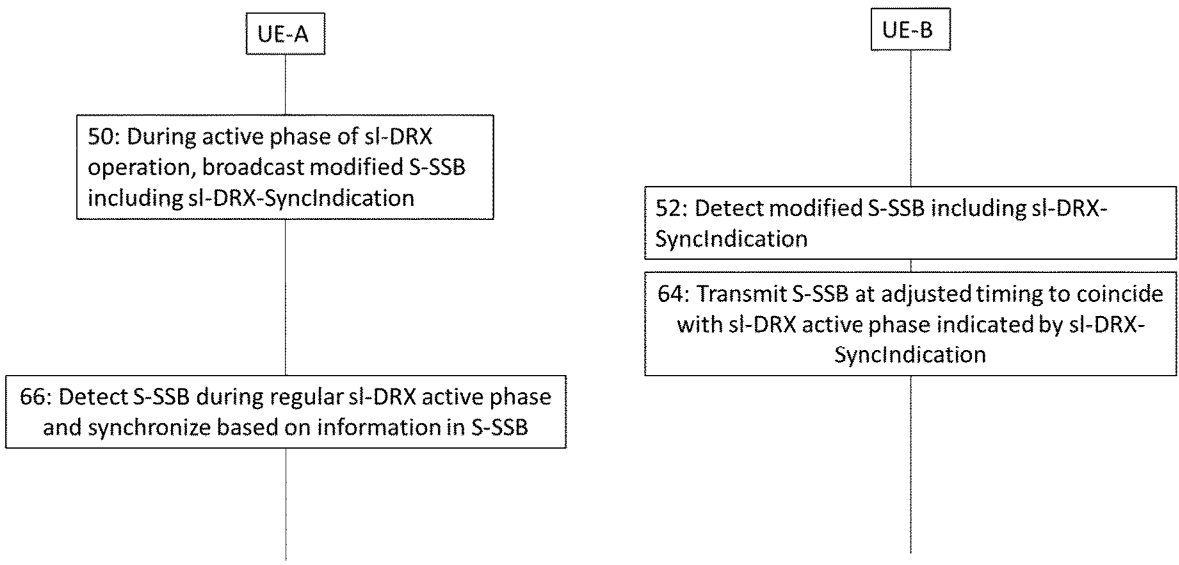
FIG. 5 shows a representation of another example of operations at two user equipments according to another example embodiment.

FIG. 5 shows another example of operations at UE-A and UE-B according to another example embodiment.

This example also comprises OPERATIONS 50 AND 52 described above.

Based on the information about the sl-DRX operation of UE-A provided by the sl-DRX-SyncIndication included in the MIB-SL of the detected S-SSB, UE-B adjusts (OPERATION 64) timing of its S-SSB transmissions to coincide with one or more regular active phases of the sl-DRX operation of UE-A.

UE-A makes no change to its sl-DRX operation. Since UE-B has adjusted the timing of the S-SSB transmissions to UE-A to coincide with at least one sl-DRX active phase of UE-A, UE-A detects (OPERATION 66) at least one S-SSB transmission made by UE-B, without UE-A making any changes to its sl-DRX operation.

UE-A adjusts its clock based on the information included provided by the S-SSB transmitted by UE-B. UE-A and UE-B are now synchronized.

Figure 6:
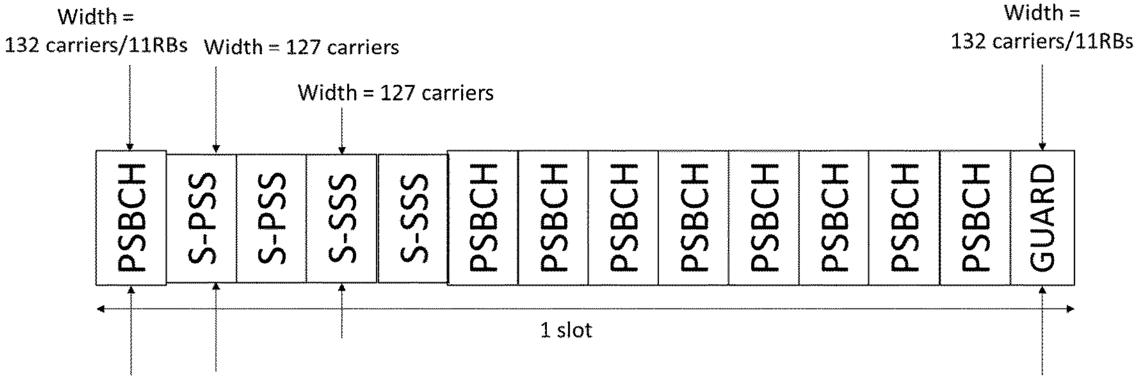
FIG. 6 shows a representation of an example of a sidelink synchronization signal block according to some example embodiments.

According to one example variation of the technique shown in FIG. 6, UE-B additionally transmits a SyncSourceReselectionIndication to UE-A. This extra message indicates to UE-A that another UE having a higher priority synchronization reference has successfully detected the sl-DRX-SyncIndication transmitted by UE-A, and that UE-A can stop broadcasting its own modified S-SSB and expect to detect a S-SSB transmission by UE during a future active phase of UE-A. The SyncSourceReselectionIndication transmitted by UE-B can be considered as a sort of response message from UE-B to the sl-DRX-SyncIndication transmitted by UE-A. For example, UE-A may switch to RX-only mode in response to detecting the SyncSourceReselectionIndication transmitted by UE-B. As in the example technique shown in FIG. 4, the SyncSourceReselectionIndication transmitted by UE-B indicates the UE-A timing (based on UE-A's DFN) of one or more S-SSB transmissions by UE-B.

For example, with reference to step 50, the described operations may comprise transmitting, from UE-A, information about sidelink synchronization of the UE-A and transmitting, from UE-A, information about reduced reception of sidelink synchronization signals at the UE-A. As discussed above. Information about sidelink synchronization of the UE-A may indicate, for example, that the UE-A is an isolated UE with a lower priority synchronization reference (e.g. UE-A's internal timer). Information about reduced reception of sidelink synchronization signals may indicate, for example, UE-A's sl-DRX configuration. Such information may be indicated with sl-DRX-Syncindication, for example. Similarly, in some examples, the UE-B may receive (e.g. in step 52) the information about reduced reception of sidelink synchronization signals at the UE-A (transmitted by UE-A). The UE-B may then take appropriate action, such as transmit information about timing of one or more sidelink synchronization signals to the UE-A (e.g. see step 54) or adjust a timing of transmission of one or more synchronization signals (e.g. see step 64).

FIG. 6 illustrates one example structure for the S-SSBs transmitted by UE-A and UE-B. In this example, the S-SSB extends over one slot. The time duration of one slot depends on the sub-carrier spacing. For a sub-carrier spacing of 15 kHz, the slot length is 1 millisecond, as shown in FIG. 6. Two symbol time periods of the slot are used for a sidelink primary synchronization signal (S-PSS): another two symbol time periods of the slot are used for a sidelink secondary synchronization signal (S-SSS); and nine symbol time periods of the slot are used for a physical sidelink broadcast channel (PBSCH) and demodulation reference signals (DMRS) (not shown).

The S-PSS is generated from one of two M sequences, and the S-SSS is generated from one of 336 Gold sequences. The combination of S-PSS and S-SSS (arising from the selected combination of M and Gold sequences) is used to indicate a sidelink synchronization identity (SSID) for the transmitting UE. Another UE detecting the S-PSS and S-SSS can identify the SSID for the transmitting UE, and derive information about the synchronization status of the transmitting UE.

Figures 7, 8:
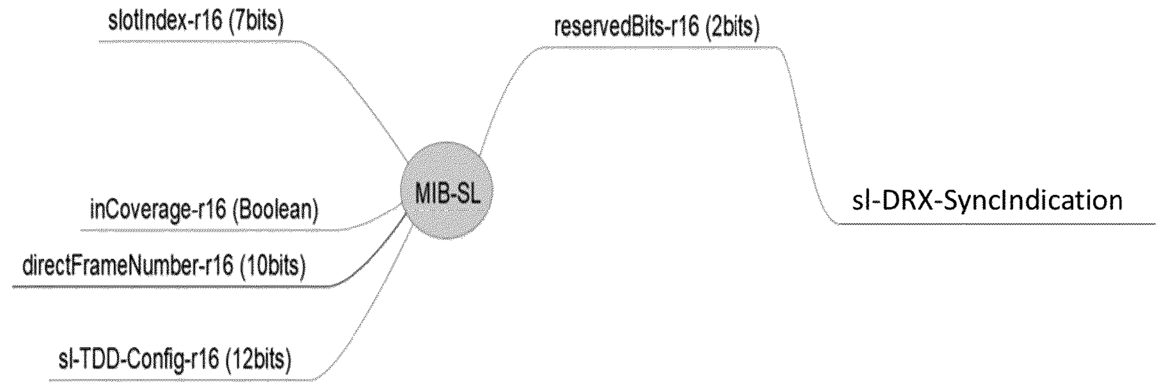
FIG. 7 shows a representation of an example of a master information block for a sidelink synchronization signal block according to example embodiments.
FIG. 8 shows a representation of another example of a master information block for a sidelink synchronization signal block according to example embodiments.

The PBSCH carries a master information block for sidelink transmissions, which may be referred to as MasterInformationBlockSidelink (MIB-SL). FIG. 7 illustrates an example structure for a MIB-SL according to 3GPP Release 16. According to this example, the MIB-SL includes: seven bits used for indicating slotIndex for sidelink transmissions: one bit used for indicating inCoverage (InC flag) for the UE: ten bits used for indicating direct frame number (DFN) for sidelink transmissions: twelve bits indicating sidelink TDD configuration; and two bits having no specific function in Release 16 and reserved for possible additional functions in later 3GPP releases. As mentioned below, according to an example embodiment, these two reserved bits may be used for the sl-DRX-SyncIndication mentioned in the examples of operations described above.

The InC flag is generally set to "1" if the UE is in coverage of a base station (e.g. gNB) of the radio access network (5G NR), and is set to "0" if the UE is out of coverage of any base station of the radio access network. In the examples described above, the InC flag in the MIB-SL transmitted by UE-A is set to "0", and the InC flag in the MIB-SL transmitted by UE-B may be set to "0" or "1". The InC flag and SL-SSID jointly indicate which synchronisation reference is used, e.g. whether a base station or GNSS is used as a primary synchronization reference.

The MIB-SL of the S-SSB is transmitted in the PSBCH symbols over the central six physical resource blocks (PRBs) of the sidelink carrier) of the S-SSB slot.

In the operations described above and shown in FIGS. 4 and 5, the SSID indicated by the S-PSS and S-SSS of the S-SSB transmitted by UE-A and the value of the InC flag of the MIB-SL of the S-SSB transmitted by UE-A together indicate to a detecting UE (UE-B) that the transmitting UE (UE-A) uses a low priority synchronization reference. The sl-DRX-SyncIndication indicates that UE-A is an isolated UE operating in sl-DRX mode.

As mentioned above, an example embodiment involves using the two reserved bits of the Release 16 MIB-SL for the sl-DRX-SyncIndication. According to one example, one bit may be used as flag to indicate that UE-A is in an isolated state, and a second bit may be used to indicate that a new MIB-SL format (not Rel-16 compatible) or a new information element (IE) (i.e. larger than 2 bits) is being used. According to another example: the reserved two bits may indicate one of four possible offset values (with respect to UE-A's DFN) indicating the next active phase of UE-A. The four values may (a) refer to slots or frames: (b) be incremental (e.g. 1,2,3,4); (c) represent an exponent of defined base e.g. 2,4,8,16 or 10,100,1000,10000; or be arbitrarily predefined values of a pre-defined set, e.g. 10,32,160, and 320.

One advantage of this implementation option is that no non-backward compatible change of the MIB-SL may be needed. Since there is no change to the format of the MIB-SL, older UEs without knowledge of the function of the two reserved bits (e.g. UEs pre-configured before introduction of this new feature for the MIB-SL) (e.g. legacy Rel-16 UEs) can continue to derive sidelink master information from S-SSB transmissions made by newer UEs (e.g. Release 17 UEs) configured with this extra sl-DRX-Sync-Indication feature (and continue to ignore the two reserved bits). Newer UEs (e.g. Release-17 UEs) may additionally derive sl-DRX-configuration information about the transmitting UE from the two reserved bits (reserved bits according to 3GPP Release 16 but now assigned a pre-defined function known to newer UEs) of the MIB-SL transmitted by other newer UEs.

In one embodiment the sl-DRX-SyncIndication may represent a Boolean, whose value indicates the isolated synchronization state (if set to True).

In another embodiment the sl-DRX-SyncIndication may use other formats such as integer or bit string to represent, for example, the offset slot value with respect to the DFN of the isolated UE (UE-A).

According to another example embodiment, a modified MIB-SL format is adopted, including a new information element sl-DRX-SyncIndication using the reserved bits (e.g. two bits as shown in the Figures) for indicating the sl-DRX configuration of the UE. FIG. 8 shows an example ASN.1 representation of the modified MIB-SL (i.e. with the added sl-DRX-SyncIndication information element).

Any UE (UE-B) detecting the modified S-SSB transmitted by an isolated UE (UE-A) can derive from the sl-DRX-SyncIndication that the isolated UE (UE-A) is operating in sl-DRX mode and seeking assistance for sidelink synchronization. The detecting UE may also derive from the sl-DRX-SyncIndication when the isolated UE (UE-A) is next in an active phase ready for detecting sidelink transmissions.

The above-described techniques can, for example, better ensure synchronization for sidelink communication between an isolated (unsynchronized) UE (e.g. a UE inside a tunnel) and at least one peer UE with a valid synchronization reference (e.g. either GNSS or eNB/gNB) when the isolated UE is (pre-)configured with SL DRX. The additional information element(s) added to the MIB-SL facilitate the synchronization procedure. A sidelink peer UE with valid synchronization reference can be better informed about the isolated state and the configured SL DRX configuration of the isolated UE.

The above-described techniques can, for example, ensure quick synchronization between UEs without (i) an isolated UE needing to ignore its SL DRX configuration and revert to an ALWAYS_ON mode, or (ii) a peer UE needing to significantly increase the number of S-SSB broadcasts (shorten the time between two consecutive S-SSB broadcasts) in order to increase the probability of S-SSB reception at an isolated UE operating in sl-DRX mode. The above-described techniques can, for example, assist an isolated UE to maintain a power saving mode of operation, while avoiding an excessive increase in the allocation of sidelink resources to S-SSB broadcasts by peer UEs (which would reduce the amount of resources available for sidelink data transmissions).

The above-described techniques can, for example, prevent needing to force a UE never to apply SL DRX when in an isolated state. Forcing an UE never to apply SL-DRX when in an isolated state would increase the power consumption at the UE for what could be a long period of time before a peer UE (providing a new sync reference) comes within range of the isolated UE.

The above-described techniques can, for example, allow an isolated UE to save power while ensuring that the isolated UE can synchronize to a peer UE without undue delay once a peer UE is within range.

Figure 9:
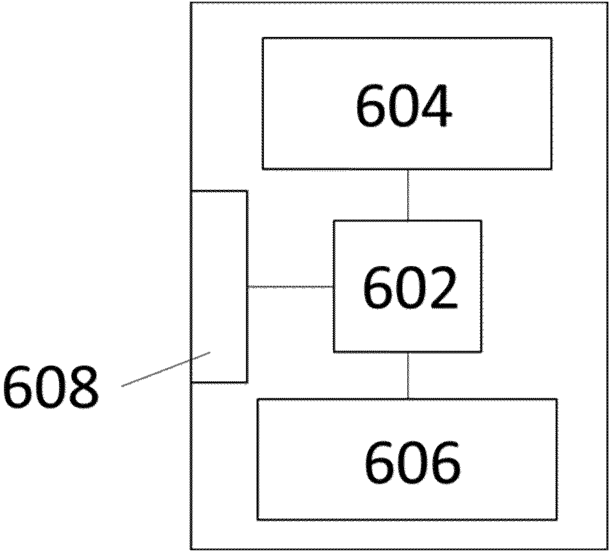
FIG. 9 shows a representation of an example of apparatus for implementing operations according to some example embodiments.

FIG. 9 illustrates an example of an apparatus for implementing the operations of a UE (isolated UE-A or non-isolated UE-B) in the embodiments described above. The apparatus may comprise at least one processor 602 coupled to one or more interfaces 608 to e.g. other equipment for which the UE functionality provides radio communications. The at least one processor 602 is also coupled to a radio unit 604 including one or more antennas etc. for making and receiving radio transmissions. The at least one processor 602 may also be coupled to at least one memory 606. The at least one processor 602 may be configured to execute an appropriate software code to perform the operations described above. The software code may be stored in the memory 606

Figure 10:
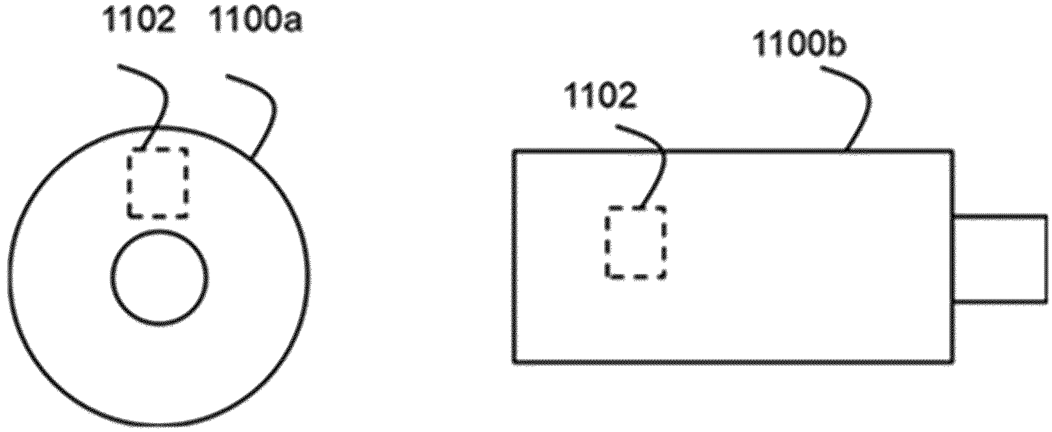
FIG. 10 shows a representation of an example of non-volatile memory media.

FIG. 10 shows a schematic representation of non-volatile memory media 1100*a* (e.g. computer disc (CD) or digital versatile disc (DVD)) and 1100*b* (e.g. universal serial bus (USB) memory stick) storing instructions and/or parameters 1102 which when executed by a processor allow the processor to perform one or more of the steps of the methods described previously.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as the base stations or user equipment of the above-described embodiments.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as the user equipment or base stations of the above-described embodiments, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method comprising:

transmitting from a user equipment information about sidelink synchronization of the user equipment; and transmitting from the user equipment information about reduced reception of sidelink synchronization signals at the user equipment, wherein the information about reduced reception of sidelink synchronization signals at the user equipment comprises information about timing of one or more active phases of a sidelink discontinuous reception mode of operation at the user equipment.

2. The method according to claim 1, wherein the information about sidelink synchronization of the user equipment indicates that the user equipment is not synchronized to a base station, or a satellite system or another user equipment.

3. The method according to claim 1, wherein transmitting the information about reduced reception of sidelink synchronization signals at the user equipment is at least partly based on a determination at the user equipment that the user equipment is not synchronized to a base station, or a satellite system or another user equipment.

4. The method according to claim 1, comprising including the information about sidelink synchronization of the user equipment and the information about reduced reception of sidelink synchronization signals at the user equipment in a sidelink synchronization signal block.

5. An apparatus comprising:

at least one processor; and at least one memory including computer program code, the at least one memory and computer program code configured to, with the at least one processor, cause the apparatus to perform:

transmitting from the apparatus information about sidelink synchronization of the apparatus; and transmitting from the apparatus information about reduced reception of sidelink synchronization signals at the apparatus, wherein the information about reduced reception of sidelink synchronization signals at the apparatus comprises information about timing of one or more active phases of a sidelink discontinuous reception mode of operation at the apparatus.

6. The apparatus according to claim 5, wherein the information about sidelink synchronization of the apparatus indicates that the apparatus is not synchronized to a base station, or a satellite system or a user equipment.

7. The apparatus according to claim 5, wherein the at least one memory and computer program code are configured to, with the at least one processor, cause the apparatus to transmit the information about reduced reception of sidelink synchronization signals at the apparatus at least partly based on a determination at the apparatus that the apparatus is not synchronized to a base station, or a satellite system or a user equipment.

8. The apparatus according to claim 5, wherein the at least one memory and computer program code are configured to, with the at least one processor, cause the apparatus to include the information about sidelink synchronization of the apparatus and the information about reduced reception of sidelink synchronization signals at the apparatus in a sidelink synchronization signal block.

9. The apparatus according to claim 8, wherein the at least one memory and computer program code are configured to, with the at least one processor, cause the apparatus to include the information about reduced reception of sidelink synchronization signals at the apparatus in a master information block of the sidelink synchronization signal block.

10. The apparatus according to claim 5, wherein the at least one memory and computer program code are configured to, with the at least one processor, cause the apparatus to: detect, at the apparatus, transmission of information about one or more sidelink synchronization signals by a user equipment; and adjust one or more parameters of the sidelink discontinuous reception mode of operation based on the information about one or more sidelink synchronization signals by the user equipment.

11. The apparatus according to claim 10, wherein the at least one memory and computer program code are configured to, with the at least one processor, cause the apparatus to: after adjusting the one or more parameters of the sidelink discontinuous reception of operation, detect, at the apparatus, transmission of one or more sidelink synchronization signals by the user equipment; and update synchronization of the apparatus based on the one or more sidelink synchronization signals.

12. The apparatus according to claim 10 wherein adjusting one or more parameters of the sidelink discontinuous reception mode of operation comprises extending an active phase of the sidelink discontinuous reception mode of operation.

13. The apparatus according to claim 12, wherein the at least one memory and computer program code are configured to, with the at least one processor, cause the apparatus to: detect the transmission of information about one or more sidelink synchronization signals by the user equipment during a first active phase of the sidelink discontinuous reception mode of operation; and wherein adjusting one or more parameters of the sidelink discontinuous reception mode of operation comprises extending the first active phase of the sidelink discontinuous reception mode of operation.

14. The apparatus according to claim 5, wherein the information about one or more sidelink synchronization signals by the user equipment comprises information about timing of one or more sidelink synchronization signals by the user equipment.

15. An apparatus comprising:

at least one processor; and at least one memory including computer program code, the at least one memory and computer program code configured to, with the at least one processor, cause the apparatus to perform:

detecting, at the apparatus, transmission of information about reduced reception of sidelink synchronization signals at a second user equipment; and transmitting, from the apparatus at a transmission time based on the information about reduced reception of sidelink synchronization signals at the second user equipment, information about timing of one or more sidelink synchronization signals by the apparatus; or adjusting a timing of transmission of one or more synchronization signals by the apparatus, based on the information about reduced reception of sidelink synchronization signals at the second user equipment, wherein the information about reduced reception of sidelink synchronization signals at the second user equipment comprises information about timing of one or more active phases of a sidelink discontinuous reception mode of operation at the second user equipment.

16. The apparatus according to claim 15, wherein the at least one memory and computer program code are configured to, with the at least one processor, cause the apparatus to: derive the information about reduced reception of sidelink synchronization signals at the second user equipment from a sidelink synchronization signal block transmission of the second user equipment.

17. The apparatus according to claim 16, wherein the at least one memory and computer program code are configured to, with the at least one processor, cause the apparatus to: derive the information about reduced reception of sidelink synchronization signals at the second user equipment from a master information block of the sidelink synchronization signal block transmission of the second user equipment.

18. The apparatus according to claim 15, wherein the at least one memory and computer program code are configured to, with the at least one processor, cause the apparatus to: transmit, at the apparatus, the one or more synchronization signals.

* * * * *